2,849,412

PLASTICIZATION OF VULCANIZED PERFLUOROCHLOROOLEFIN POLYMERS

Lester E. Robb, Westfield, and David R. Wolf, Bloomfield, N. J., assignors, by mesne assignments, to Minnesota Mining and Manufacturing Company, St. Paul, Minn., a corporation of Delaware No Drawing. Application May 11, 1955
Serial No. 507,714

11 Claims. (Cl. 260—30.6)

This invention relates to perfluorochloroolefin polymers and in one of its more particular aspects to plasticizers for improving the low temperature characteristics of the perfluorochloroolefin polymers.

Because of their unusual chemical and physical characteristics, the fluorine-containing thermoplastic polymers are widely used in numerous industrial applications. Among the most outstanding of the properties of the fluorine-containing thermoplastic polymers, such as polymers of trifluorochloroethylene, is chemical inertness. Thus, these polymers can be exposed to a wide variety of oxidizing, reducing and solvent-type reagents with no apparent effect on the polymer. In addition to their high degree of chemical stability, these polymers possess high thermal stability, excellent electrical properties and are readily molded into various useful end items. The general utility of the perfluorochloroolefin polymers has been extended by recent devolopments which permit the copolymerization of perfluorochloroolefin polymers with other hydrogen-containing fluorinated olefins. These copolymers retain many of the desirable characteristics of the homopolymer, such as chemical resistance and thermal stability, and in addition, have characteristics which make them useful over and above the homopolymer. Thus, copolymers of perfluorochloroolefins copolymerized with hydrogen-containing fluorinated olefins containing above about 95 mol percent of the perflourochloroolefin can be molded more readily than the corresponding perfluorochloroolefin homopolymer. Copolymers containing above about 69 and below 80 mol percent of a perfluorochloroolefin copolymerized with a hydrogen-containing fluorinated olefin are soluble in a variety of relatively common oxygenated organic solvents and hence, are quite useful in coating applications. Copolymers containing between about 20 and about 69 mol percent of the perfluorochloroolefin are elastomeric in nature and are valuable substitutes for natural and synthetic rubber, particularly where adverse environmental conditions prevail.

In many of the applications in which industrial users employ these polymers, it is desirable that the properties of the polymer be somewhat modified. Frequently, it is desirable to improve the low temperature characteristics of the polymer system so that the various fabricated end items can be used over relatively extreme temperature ranges. Modification of the polymers properties is usually effected by plasticization.

It is an object of this invention to provide a non-volatile plasticizer for plasticizing perfluorochloroolefin polymers.

It is another object of this invention to provide compatible plasticizers for the perfluorochloroolefin polymers.

It is one of the more particular objects of this invention to provide plasticizers which improve the low temperature characteristics of the elastomeric polymers of the perfluorochloroolefins.

It is still one of the more particular objects of this invention to provide plasticizers which improve the low temperature properties of copolymers of trifluorochloroethylene and vinylidene fluoride containing between about 20 and about 69 mol percent of trifluorochloroethylene.

It is one of the additional objects of this invention to provide a process for plasticizing perfluorochloroolefin polymers.

Various other objects and advantages of the present invention will become apparent to those skilled in the art on reading the accompanying description and disclosure.

In general, the above objects are accomplished by admixing with a perfluorochloroolefin polymer, such as a copolymer of trifluorochloroethylene and vinylidene fluoride, an ester having the formula RO—X—(OR)$_n$ in which R is selected from the group consisting of monovalent aromatic and aliphatic radicals and X is selected from the group consisting of aromatic and aliphatic dicarboxylic radicals (i. e., radicals having the formula

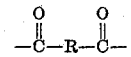

in which R is an alkylene or a divalent aromatic radical) and a phosphoryl (P=O) radical, and where X is a dicarboxylic radical $n$ is equal to 1 and where X is a phosphoryl (P=O) radical $n$ is equal to 2. In the above formula, R has between about 2 and about 18 carbon atoms and preferably between about 4 and about 10 carbon atoms. Esters falling within this group have a boiling point over 75° C. and a freezing point under 0° C.

As indicated previously, the present invention relates to the plasticization of perfluorochloroolefin polymers and particularly to the plasticization of copolymers of perfluorochloroolefins copolymerized with hydrogen-containing fluorinated olefins. Among the perfluorochloroolefin monomers to which this invention is applicable, are trifluorochloroethylene, 1,1-difluorodichloroethylene, 1,2-difluorodichloroethylene and trichlorofluoroethylene. Among the hydrogen-containing fluorinated olefins which are useful as comonomers with the above described perfluorochloroolefins, are vinyl fluoride, vinylidene fluoride, 1,1-difluoroethylene, and trifluoroethylene. The preferred copolymer system is the copolymer of trifluorochloroethylene and vinylidene fluoride.

Since this invention relates to the plasticization of the perfluorochloroolefin polymers, and not to their preparation, unnecessarily detailed description of the methods for their preparation are not warranted. However, in order to clearly illustrate the invention, the preparation of the elastomeric copolymer of trifluorochloroethylene and vinylidene fluoride is presented below.

The elastomeric copolymer can be prepared using the following water-suspension type recipe:

| | Parts by weight |
|---|---|
| Water, distilled | 200 |
| CF$_2$=CFCl } 50/50 molar | 64.5 |
| CF$_2$=CH$_2$ | 35.5 |
| K$_2$S$_2$O$_8$ | 1.0 |
| Na$_2$S$_2$O$_5$ | 0.4 |
| FeSO$_4$·7H$_2$O | 0.1 |

Catalyst and activator solution was prepared by dissolving 1 part of K$_2$S$_2$O$_8$ in 20 parts of water. In still another 20 parts of water, 0.1 part of $FeSO_4.7H_2O$ was dissolved. 140 parts of water were next charged to a silver-lined steel bomb. The aforementioned $K_2S_2O_8$, $Na_2S_2O_5$, and $FeSO_4.7H_2O$ solutions were then added in succession. The contents of the bomb were frozen after each addition. The bomb was then closed and evacuated. Thereafter, 64.5 parts of $CF=CFCl$ and 35.5 parts of $CF_2=CH_2$ were flash-distilled into it. The bomb was then rocked at room temperature (between about 25° C. and about 35°C.) for a period of 24 hours. The residual monomer was then vented from the bomb and a mixture of water and chunks of rubbery polymer were discharged. These chunks were washed with hot water to remove residual salts, and were then dried in vacuo at room temperature. The mol percent of $CF_2=CFCl$ combined in the resulting copolymeric product was 49 percent. By employing the polymerization technique described above, and by adjusting the molar feed ratios and using different monomers, the copolymers described above can be prepared.

As indicated previously, the esters which are used as plasticizers in this invention are those having the general formula RO—X—(OR)$_n$. These esters are prepared by reacting a monohydric compound, e. g., an alcohol or a phenol with an acid. The alcohols which are used in preparing the esters of this invention are the aliphatic, heterocyclic, and aromatic alcohols having from 2 to 18 carbon atoms. The term "aliphatic alcohol," includes the alkyl alcohols and the saturated and unsaturated heterocyclic and cyclic, i. e., alicyclic alcohols. Representative of the preferred cyclic alcohols, are cyclobutanol, cyclopentanol, cyclohexanol, cycloheptanol and cyclooctanol. Representative of the heterocyclic alcohols, are furfuryl alcohol, tetrahydrofurfuryl alcohol, and the methyl and dimethyl substituted tetrahydrofurfuryl alcohols. Representative of the phenols which can be employed, are phenol, cresol, and the xylenols. The acids which are esterified with the above described monohydric alcohols are the various aliphatic and aromatic dicarboxylic acids and phosphoric acid. The dicarboxylic acids which are employed, are the aliphatic and aromatic acids which contains from 3 to 18 carbon atoms, and preferably from 4 to 10 carbon atoms, and include such compounds as adipic acid, pimelic acid, suberic acid, azelaic acid, sebacic acid, and phthalic acid. Within the general formula described above, are esters having the formula ROOC—R'—COOR, in which R is a monovalent aliphatic radical having from 2 to 18 carbon atoms, preferably from 4 to 10 carbon atoms and R' is a radical selected from the group consisting of alkylene and divalent aromatic radicals having from 3 to 18 carbon atoms, and preferably from 4 to 10 carbon atoms. Also included within the formula RO—X—(OR)$_n$ are esters having the formula $RO_3$—P=O, in which R is selected from the group consisting of monovalent aliphatic and phenyl radicals having from 3 to 18 carbon atoms, and preferably from 4 to 10 carbon atoms. Examples of typically suitable esters are listed below.

Straight chain esters:
    Diethyl adipate
    Diethoxyethyl adipate
    Didecyl adipate
    Dibutylsebacate
    Dibutoxyethyl sebacate Branched chain aliphatic esters:
    Di-(2-ethylhexyl) adipate
    Di-(2-ethylhexyl) sebacate Aromatic esters:
    Dipropylene glycol dibenzoate
    Polyethylene glycol (200) dibenzoate
    Dioctyl phthalate
    Dibutoxyethyl phthalate
    Diallyl phthalate Alicyclic esters:
    Ditetrahydrofurfuryl succinate
    Di-(2-ethylhexyl) hexahydrophthalate Phosphoric acid esters:
    Tricresyl phosphate
    Tributoxyethyl phosphate In preparing the compositions of this invention, between about 1 and about 30 parts by weight of plasticizer is used for each 100 parts of polymer and preferably between about 5 and about 25 parts of plasticizer per 100 parts of polymer. Blending the plasticizer in the polymer can be carried out in any suitable blending equipment which insures intimate dispersion of the plasticizer through the polymer mass. A two roll rubber mill, ball and pebble mills, and Banbury mixers are illustrative pieces of blending equipment.

The plasticizers of this invention can be used with the thermoplastic and elastomeric perfluorochloroolefin polymers to produce a plasticized thermoplastic or softened gum stock. For example, a copolymer of trifluorochloroethylene and vinylidene fluoride (50/50 mol ratio) is banded on a two roll rubber mill. Approximately 20 parts of dioctyl sebacate per 100 parts of the copolymer is added to the banded elastomer on the mill. After blending, the composition is stripped from the mill and molded into a sheet which has improved physical properties. However, copolymers of the perfluorochloroolefins and particularly the elastomeric copolymers, that is, those having a mol concentration of perfluorochloroolefin between about 20 and about 69 mol percent, are susceptible to cross-linking or vulcanization. While the use of the plasticizer is advantageous in those instances where uncured or gum rubber is required, in most instances it will be found preferable to incorporate curing or cross-linking agents and accelerators into the polymer.

Curing or cross-linking of the copolymer is effected by incorporating within the copolymer a cross-linking agent which can be a peroxy type compound, a polyfunctional amino compound or a precursor of a polyfunctional amino compound. The peroxy type compounds include both organic and inorganic compounds which contain oxygen atoms directly linked to oxygen atoms and which should be stable below about 50° C. in order to avoid cross-linking during the blending operation. Among the organic peroxy compounds, are the alkyl, acyl and aroyl peroxides, and hydroperoxides, such as ditertiary butyl peroxide, dilauryl peroxide, dibenzoyl peroxide and ditertiary butyl hydroperoxide. The peroxy type compounds also include peresters having either organic or inorganic peroxy oxygen. The former would include alkyl and aryl persulfates. Among the inorganic peroxy compounds, are hydrogen and metal peroxides, such as lead, barium and zinc peroxide. Among the polyfunctional amine compounds which may be used as cross-linking agents, are ethylene diamine, diethylene triamine, triethylene tetramine, tetraethylene pentamine, hexamethylene diamine, piperazine, 1,5-naphthalene diamine, diaminoanisole, diaminobenzoic acid (all isomers), diamino stilbene (all isomers), diaminotriphenylmethane, triaminotriphenylmethane, diaminophenol (all isomers), tetramino, 3,3-dimethyl-diphenylmethane, diaminobenzene (all isomers), triaminobenzene (all isomers), triaminobenzoic acid (all isomers), triaminophenol, 1,2-propylene-diamine, 1,2,3-triaminopropane, etc. Among the precursors of amines, are the polyisocyanates, polyisothioamine, polyamine salts, polyureas, polycarbamyl halides and polyurethanes. Precursors of amines are compounds which by their own decompositions or by reaction with other materials under curing conditions, produce polyamines. Preferred amines are the primary aliphatic diamines. The curing or cross-linking agent is used in a concentration between about 0.5 and about 20 parts by weight preferably between about 3 and about 15 parts by weight based on 100 parts by weight of polymer.

In cross-linking the perfluorochloroolefin polymers, it is preferred to incorporate in addition to the above described cross-linking agents basic metal compounds which react as accelerators. Among the basic metal compounds which can be employed as accelerators, are the basic metal oxides, such as magnesium oxide, zinc oxide and lead oxide and additionally, in the case of peroxide cured recipes, the basic lead salts, such as dibasic lead phosphite, tribasic lead sulfate and tribasic lead maleate. Where basic lead salts are used they are preferably used in combination with basic metal oxides since a synergistic effect appears to result from the combination. The precise mechanism of the acceleration is not known. The concentration of the basic metal compound will vary from about 0.5 to about 30 parts by weight and preferably from about 1 to about 20 parts by weight for each 100 parts of polymer.

In compounding the perfluorochloroolefin copolymer so as to effect cross-linking, the copolymer is mixed with suitable accelerators and curing agents. To improve physical properties, plasticizers, as described above, are added to the polymer. Blending of the components is carried out in suitable mechanical mixing equipment, such as two roll mills, Banbury mills and screw type plasticators. Since the mechanical blending involves shearing forces which necessarily generate heat, the cross-linking or curing agent is usually added last. In a preferred method of operation, the copolymer is introduced into the mixing equipment after which the accelerator and the plasticizer are added. When these have been thoroughly dispersed in the copolymer, the curing agent is added. Curing of the polymer is effected using an initial (e. g., press) cure between about 150° F. and about 350° F. for a period of time between about 10 minutes and about 3 hours at a pressure between about 500 and about 1500 p. s. i. followed by an after cure (e. g., oven cure) at between about 250° F.–350° F. for between about 1 and about 72 hours at atmospheric pressure. In the case of peroxide cured recipes low initial cures are preferred, e. g., between about 190° F. and about 250° F. while in the case of amine cured stock, higher cures are preferred, i. e., between about 250° F. and about 300° F. Molding can be accomplished using compression, extrusion and injection techniques.

In order to illustrate the process of this invention, the following examples are presented.

EXAMPLE I

This example compares the physical characteristics, presented in Table I below, of unplasticized and plasticized vulcanized stock. The copolymer used in each instance, was a copolymer of trifluorochloroethylene and vinylidene fluoride having a 50/50 molar ratio. In preparing the recipes, 100 grams of the copolymer was banded on a two roll rubber mill and maintained at a temperature of approximately 125° F. Approximately 20 grams of plasticizer was added to each of the recipes except No. 222 which was unplasticized and which served as a control. After the addition of plasticizer, approximately 10 grams of zinc oxide was added and thoroughly blended. Approximately 20 grams of carbon black (a filler) was then added. In the case of recipes containing dibasic lead phosphite, the dibasic lead phosphite was added simultaneously with the zinc oxide. After all other ingredients were thoroughly blended, approximately 1½ grams of tetraethylene pentamine was added to the gum on the two roll rubber mill. When the cross-linking agent had been thoroughly dispersed, the compounded stock was sheeted out into a sheet approximately 10 percent thicker than the final desired sheet. A. S. T. M. test slabs were molded. The press curing cycle and the oven curing cycle are given in the table.

Table I

| Recipe | 222 | 224 | 233 | 234 |
|---|---|---|---|---|
| Trifluorochloro-ethylene - vinylidene fluoride copolymer (50/50 molar ratio) | 100 | 100 | 100 | 100 |
| Zinc oxide | 10 | 10 | 10 | 10 |
| Tetraethylene-pentamine | 1.5 | 1.5 | 1.5 | 1.5 |
| Carbon black | 20 | 20 | 20 | 20 |
| Dibasic lead phosphite |  |  | 10 | 10 |
| Plasticizer: |  |  |  |  |
| Dioctyl sebacate |  | 20 |  |  |
| Dioctyl phthalate |  |  | 20 |  |
| Tricresyl phosphate |  |  |  | 20 |
| Press cure: |  |  |  |  |
| Hours | .5 | .5 | .5 | .5 |
| ° F | 250 | 250 | 250 | 250 |
| Pressure (p. s. i. g.) | 1,000 | 1,000 | 1,000 | 1,000 |
| Oven cure: |  |  |  |  |
| Hours | 8 | 8 | 8 | 8 |
| ° F | 250 | 250 | 250 | 250 |
| Pressure atm. (p. s. i. g.) | 1 | 1 | 1 | 1 |
| Physical properties: |  |  |  |  |
| Tensile strength (p. s. i.) | 2,380 | 1,460 | 760 | 750 |
| Stress at 100% E | 1,280 | 240 |  |  |
| Elongation, percent | 250 | 450 | 750 | 900 |
| Hardness shore A | 78 | 55 | 55 | 55 |
| Specific gravity | 1.9 | 1.7 |  |  |
| Compression set, 16/hrs./2.2° F | 50 | 31 |  |  |
| Bayshore resilience | 5 | 25 | 9 | 18 |
| Gehman stiffness: |  |  |  |  |
| $T_2$, ° C | +5 | −30 | +5 | −4 |
| $T_5$, ° C | 0 | −35 | −4 | −9 |

EXAMPLE II

Substantially equivalent results are obtained when 20 grams of diethyl adipate, diethoxyethyl adipate, didecyl adipate, dibutyl sebacate, dibutoxy ethyl sebacate, and di-(2-ethyl hexyl) adipate, are substituted for the dioctyl sebacate of recipe 224 in Table I.

EXAMPLE III

Substantially equivalent results are obtained when 20 grams of diallyl phthalate, dibutoxy ethyl phthalate, and dipropylene glycol dibenzoate, are substituted for the dioctyl phthalate in recipe 233 of Table I.

EXAMPLE IV

Substantially equivalent results are obtained when 20 grams of tributoxy ethyl phosphate, trioctyl phosphate, and triphenyl phosphate, are substituted for the tricresyl phosphate in recipe 234 in Table I.

Various alterations and modifications of the invention and its aspects may become apparent to those skilled in the art without departing from the scope of this invention.

Having thus described our invention, we claim:

1. A novel composition comprising a vulcanized copolymer of trifluorochloroethylene and vinylidene fluoride said polymer being vulcanized with a cross-linking agent selected from the group consisting of polyfunctional amines, polyisocyanates, and organic peroxides admixed with a plasticizer having the formula RO—X—(OR)$_n$ in which R is selected from the group consisting of 2 to 18 carbon monovalent aromatic hydrocarbon and aliphatic hydrocarbon radicals and X is selected from the group consisting of a phosphoryl radical and a dicarboxylic radical having the formula

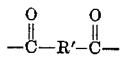

in which R' is selected from the group consisting of 3 to 18 carbon alkylene hydrocarbon and divalent aromatic hydrocarbon radicals and where X is a dicarboxylic radical $n$ is equal to 1, and where X is a phosphoryl radical $n$ is equal to 2.

2. A novel composition comprising a vulcanized copolymer containing between about 20 and about 69 mol percent of trifluorochloroethylene copolymerized with vinylidene fluoride admixed with a plasticizer having the formula RO—X—(OR)$_n$ in which R is selected from the group consisting of 2 to 18 carbon monovalent aromatic hydrocarbon and aliphatic hydrocarbon radicals and X is selected from the group consisting of a phosphoryl radical and a dicarboxylic radical having the formula

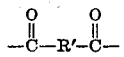

in which R' is selected from the group consisting of 3 to 18 carbon alkylene hydrocarbon and divalent aromatic hydrocarbon radicals and where X is a dicarboxylic radical $n$ is equal to 1, and where X is a phosphoryl radical $n$ is equal to 2 and a cross-linking agent selected from the group consisting of polyfunctional amines, polisocyanates, and organic peroxides.

3. The composition of claim 2 in which the cross-linking agent is a polyfunctional amine.

4. The composition of claim 2 in which the cross-linking agent is a polyisocyanate.

5. The composition of claim 2 in which the cross-linking agent is an organic peroxide.

6. The composition of claim 3 in which the polyfunctional amine is tetraethylene pentamine.

7. The composition of claim 4 in which the polyisocyanate is methylene bis(4-phenyl-isocyanate).

8. The composition of claim 5 in which the organic peroxide is benzoyl peroxide.

9. A novel composition comprising a vulcanized copolymer containing between about 20 and about 69 mol percent of trifluorochloroethylene copolymerized with vinylidene fluoride admixed with a cross-linking agent selected from the group consisting of polyfunctional amines, polyisocyanates, and organic peroxides in an amount between about 1 and about 20 parts per 100 parts by weight of said copolymer and a plasticizer having the general formula ROOC—R'—OOR in which R is selected from the group consisting of 2 to 18 carbon monovalent aliphatic hydrocarbon radicals and R' is selected from the group consisting of 3 to 18 carbon alkylene hydrocarbon and divalent aromatic hydrocarbon radicals in an amount between about 1 and about 30 parts by weight per 100 parts of said copolymer.

10. A novel composition comprising a vulcanized copolymer containing between about 20 and about 69 mol percent of trifluorochloroethylene copolymerized with vinylidene fluoride admixed with a cross-linking agent selected from the group consisting of polyfunctional amines, polyisocyanates, and organic peroxides in an amount between about 1 and about 20 parts per 100 parts by weight of said copolymer and a plasticizer having the general formula $RO_3$—P=O in which R is selected from the group consisting of 3 to 18 carbon monovalent aliphatic hydrocarbon and aromatic hydrocarbon radicals.

11. A homogeneous copolymer mass comprising a vulcanized copolymer containing between about 20 and about 69 mol percent of trifluorochloroethylene copolymerized with vinylidene fluoride said polymer being vulcanized with a cross-linking agent selected from the group consisting of polyfunctional amines, polyisocyanates, and organic peroxides having dispersed through its mass a plasticizer having the general formula RO—X—(OR)$_n$ in which R is selected from the group consisting of monovalent aromatic hydrocarbon and aliphatic hydrocarbon radicals and X is selected from the group consisting of a phosphoryl radical and a dicarboxylic radical having the formula

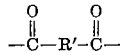

in which R' is selected from the group consisting of 3 to 18 carbon alkylene hydrocarbon and divalent aromatic hydrocarbon radicals, and where X is a dicarboxylic radical $n$ is equal to 1, and where X is a phosphoryl radical $n$ is equal to 2.

References Cited in the file of this patent

UNITED STATES PATENTS

| | | |
|---|---|---|
| 2,468,054 | Ford | Apr. 26, 1949 |
| 2,686,770 | Dipner | Aug. 17, 1954 |